(12) United States Patent
Osterlaenger et al.

(10) Patent No.: US 7,694,600 B2
(45) Date of Patent: Apr. 13, 2010

(54) BALL SCREW

(75) Inventors: Jüergen Osterlaenger, Emskirchen (DE); Ralf Mayer, Herzogenaurach (DE); Dieter Adler, Herzogenaurach (DE); Manfred Kraus, Herzogenaurach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 301 days.

(21) Appl. No.: 11/264,307

(22) Filed: Nov. 1, 2005

(65) Prior Publication Data
US 2006/0101934 A1 May 18, 2006

(30) Foreign Application Priority Data
Nov. 17, 2004 (DE) .............. 10 2004 055 423

(51) Int. Cl.
*F16H 1/24* (2006.01)
(52) U.S. Cl. ................................. 74/424.82
(58) Field of Classification Search ............... 74/89.23, 74/424.82, 388 PS, 424.87, 424.86, 424.81, 74/424.83, 216.3
See application file for complete search history.

(56) References Cited

U.S. PATENT DOCUMENTS 3,143,896 A * 8/1964 Edwards ................. 74/424.86
5,005,436 A * 4/1991 Brusasco ................. 74/424.87
5,373,755 A * 12/1994 Rohlinger ................ 74/424.86
5,711,188 A * 1/1998 Miyaguchi et al. ........ 74/424.87
5,937,700 A * 8/1999 Brown et al. ............. 74/424.86
6,237,434 B1 * 5/2001 Brown et al. ............. 74/424.82
6,439,338 B2 * 8/2002 Yoshioka et al. ........... 180/444
2004/0045388 A1 * 3/2004 Sugita .................... 74/424.87
2006/0169080 A1 * 8/2006 Iida et al. ................ 74/424.87

FOREIGN PATENT DOCUMENTS

| DE | 33 04 784 | 9/1983 |
| DE | 38 08 989 | 9/1988 |
| DE | 100 11 383 | 9/2001 |
| DE | 100 56 275 | 5/2002 |
| DE | 103 04 868 | 8/2003 |
| DE | 103 46 079 | 8/2004 |

* cited by examiner

*Primary Examiner*—Richard W L Ridley
*Assistant Examiner*—Alan B Waits
(74) *Attorney, Agent, or Firm*—Charles A. Muserliar

(57) ABSTRACT

Ball screw, having a spindle nut (2) which may be provided on a recirculating ball screw (1) and on the inner circumference of which turns (3) of ball grooves (4), helically wound around an axis, are provided in which balls (5) can roll, at least one return element (8), arranged on the outer circumference of the spindle nut (2) and provided with a return duct (9) for the balls (5), at its two ends connecting a start of a turn (3) to an end of a turn (3) in order to permit a continuous recirculation of the balls (5), the return element (8) between its two ends being supported on a support (15, 21), the return element (8) being resiliently supported by means of at least one spring element (14) on the support (15, 21).

10 Claims, 3 Drawing Sheets

Figure 1:
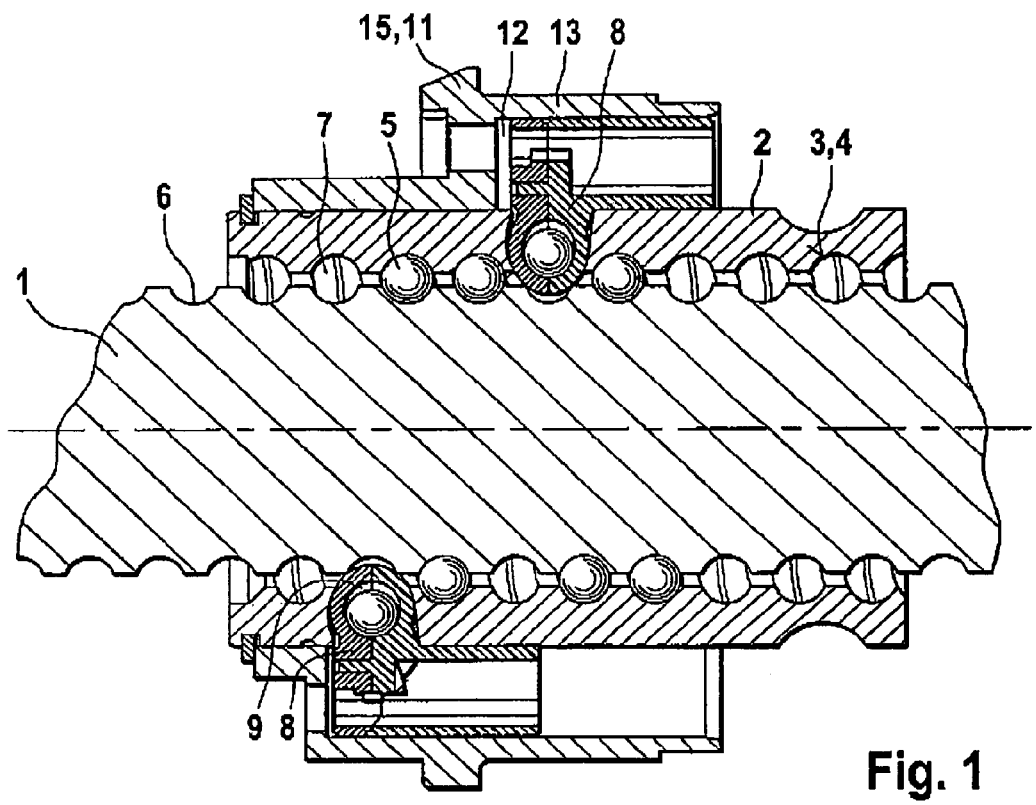

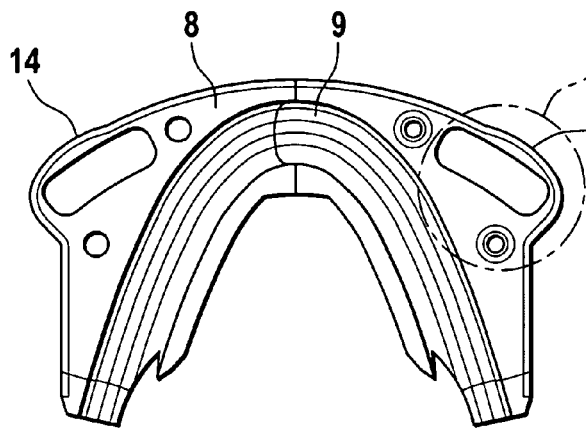
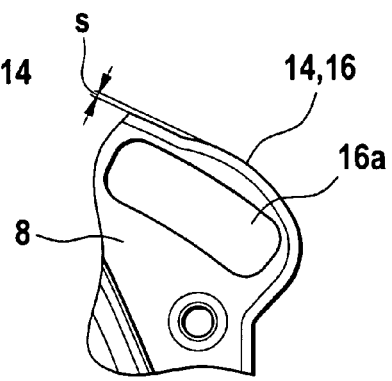
Fig. 3    Fig. 4
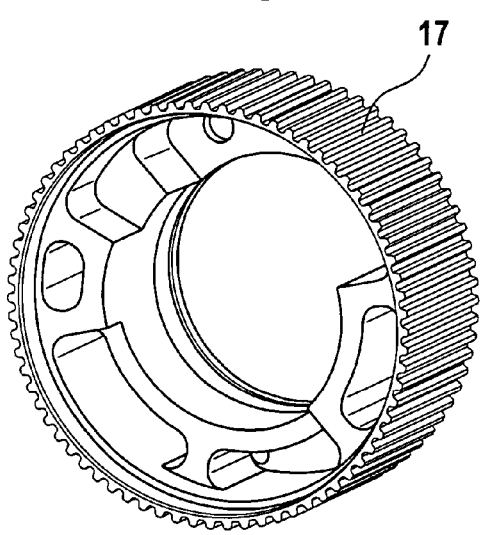
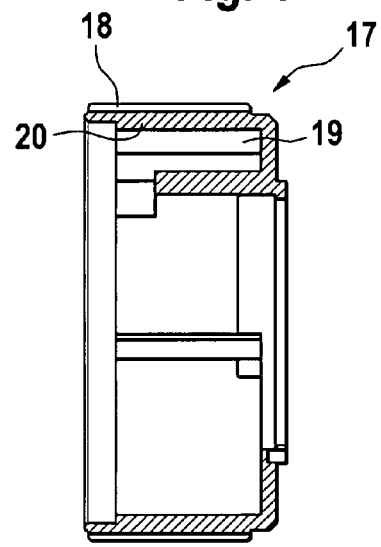
Fig. 5    Fig. 6
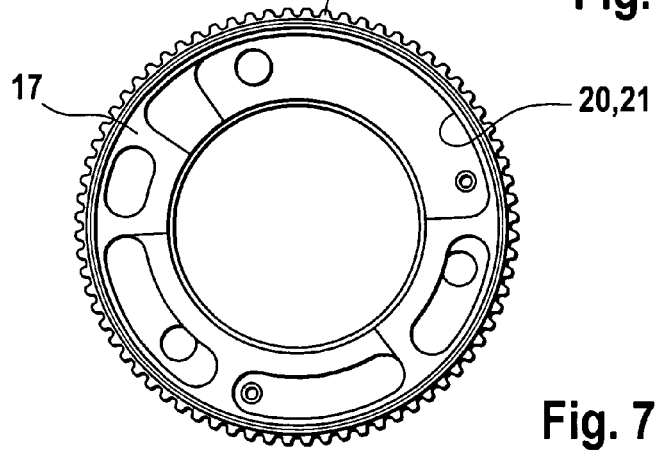
Fig. 7

BALL SCREW

FIELD OF THE INVENTION

The present invention relates to a ball screw. These mechanisms translate rotational movements into linear movements. In modern motor vehicles ball screws are being increasingly used in electromechanical power steering systems for rack-and-pinion steering. In such power steering systems the steering rack sometimes takes the form of a recirculating ball screw. An electric motor drives the spindle nut, so that a longitudinal displacement of the steering rack is assisted by electromotive means.

DE 100 56 275 A1, for example, disclosed a ball screw, having a spindle nut arranged on a recirculating ball screw, on the inner circumference of which nut turns of ball grooves, helically wound around an axis, are provided in which balls can roll. Return elements, each provided with a return duct for the balls, are arranged on the outer circumference of the spindle nut. With their two ends these return elements connect a start of a turn to an end of a turn, in order to permit a continuous recirculation of the balls. The return element is arranged in a recess in the fixing flange and is held in a radial direction. This fixing flange is firmly connected to the spindle nut. The recess in the fixing flange may be of somewhat larger design, in order to allow some radial play between the fixing flange and the return piece. This radial play may be necessary in order to take account of production tolerances. Unwanted rattling noises can furthermore manifest themselves when the return element strikes against the fixing flange. In the event of excessive radial play, correct guidance of the return piece outside the spindle nut is no longer assured. In the event of too little radial play the return piece may possibly jam, which can likewise adversely effect the correction functioning of the ball screw.

The object of the present invention is to specify a ball screw according to the features of the pre-characterizing part of Claim 1, which is easy to manufacture and which functions reliably, ensuring a correct recirculation, especially in the return element.

According to the invention this object is achieved in that the return element is resiliently supported by means of at least one spring element on the support formed, for example, by a fixing flange. The arrangement of the spring element considerably reduces the influence of the radial play on the working and the operating reliability of the ball screw. The invention furthermore ensures that in the event of any radial play rattling is prevented, since the return element can no longer oscillate freely and strike against the inner wall of the fixing flange, for example, thereby causing unwanted rattling noises.

A spring travel of the spring element is preferably limited by stops provided on the return element and on the support. Limiting the spring travel ensures that undesirably large deflections of the return element are excluded. Within the spring travel, movements between the support and the return element are possible. These stops may simply be formed by the opposing walls of the support and the return element.

Multiple such spring elements may be arranged, preferably distributed symmetrically, between the ends of the return element. In a symmetrical arrangement of the spring elements the return element is uniformly supported in relation to the support, thereby ensuring correct positioning of the return element in relation to the support and in relation to the spindle nut.

As spring elements, separate springs may be provided, which are arranged between the return element and the support and which are supported on the support and on the return element.

It is particularly advantageous, however, if the return element is itself resilient and is resiliently supported on the support. The return element may accordingly be of elastic design in such a way that it can be accommodated even in the most unfavorable installation conditions, for example, in a recess of a fixing flange, without adversely affecting the working of the ball screw, whilst at the same time preventing unwanted rattling noises.

The return element may be resiliently formed on at least one spring point facing the support and may be sprung by this spring point against the support. Such spring points, for example, may be tongues which are integrally formed onto the return element and project radially from the contour of the return element, and are sprung against the support. These spring points, however, can also be webs standing proud of the contour of the return element, which have resilient characteristics. In these cases such return elements may be made from injection-moulded plastic, for example. The particular advantage is that no additional means are required to form a ball screw according to the invention.

The return element may have an external contour matched to the internal contour of the support, the return element being provided at a distance from its external contour with at least one recess, in such a way that the recess and the external contour define a resilient web forming the support. Such a return element can advantageously be formed from injection moulded plastic.

The support may be formed by a gear wheel arranged rotationally fixed on the spindle nut, a chamber to accommodate the return element being provided between the toothed rim of the gear wheel and the spindle nut. In this case an internal contour of the toothed rim and the external contour of the return element may be matched to one another, the spring element being sprung against the internal contour of the toothed rim. This development according to the invention is particularly compact, since the return element is accommodated inside the gear wheel.

The spring travel of the spring element referred to above may be defined by the distance between the internal contour of the support and the external contour of the return element.

The spring travel is designed so that even if the spring element should fail, the basic position of the return element in relation to the spindle nut is maintained. The small amount of play then occurring between the return element and the support would not adversely affect the basic working of the ball guide.

Figure 2:
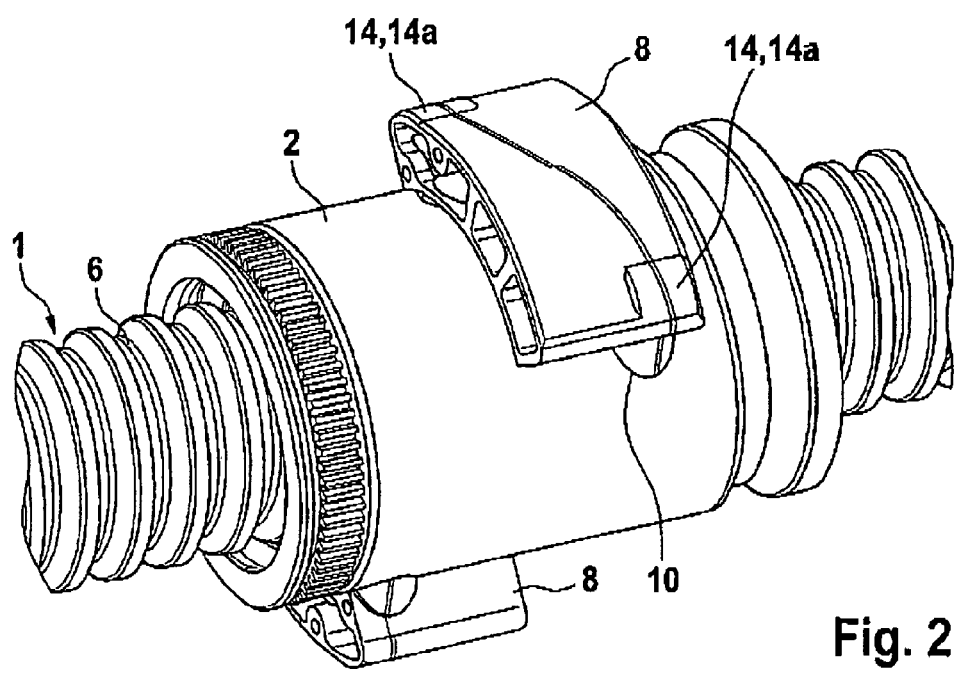
Figure 8:
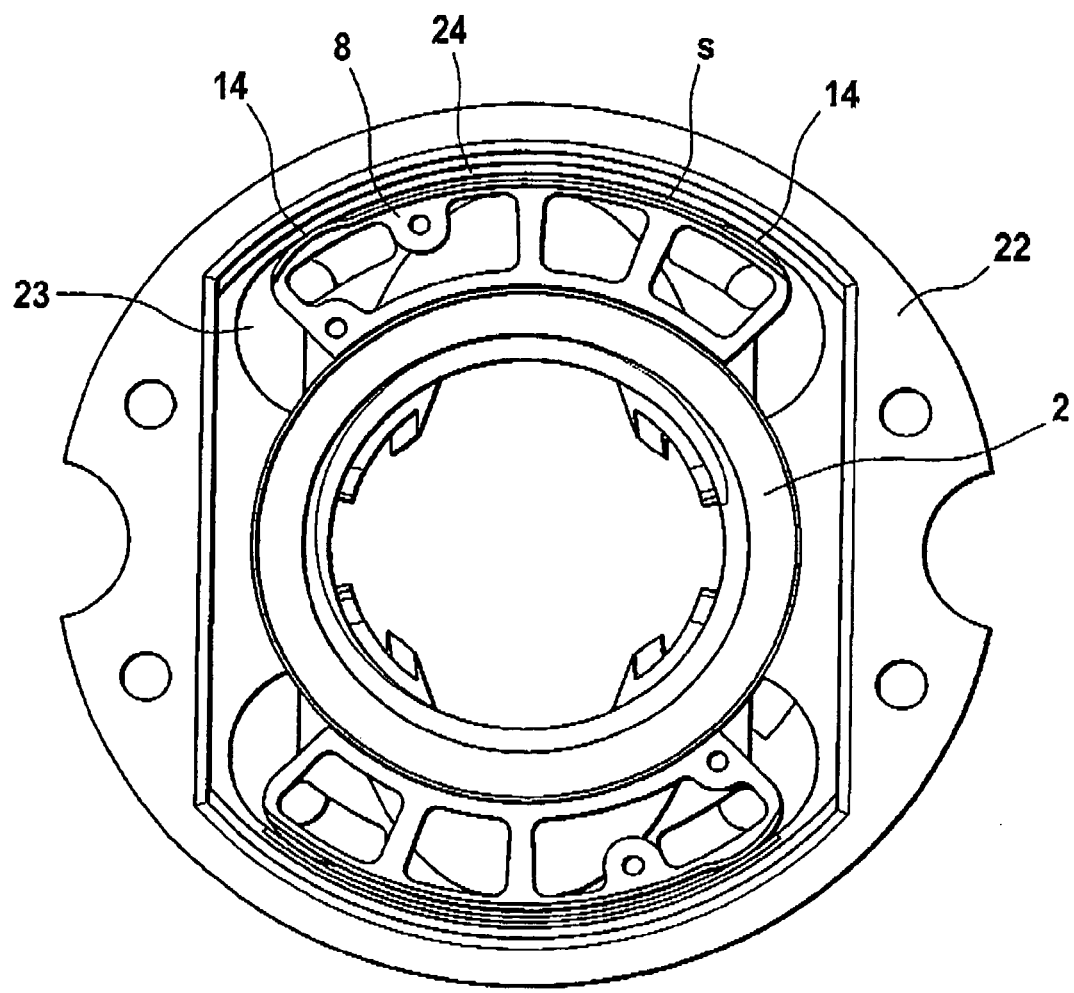

The invention will be explained in more detail below with reference to two exemplary embodiments depicted in a total of eight figures, of which:

FIG. 1 shows a longitudinal section through a ball screw according to the invention, FIG. 2 shows a perspective view of the ball screw according to FIG. 1, but with the return element exposed, FIG. 3 shows a half of a return element of the ball screw according to FIG. 1, FIG. 4 shows an enlarged representation of a detail in FIG. 3, FIG. 5 shows a perspective view of a gear wheel for the rotationally fixed arrangement of a further ball screw according to the invention on a spindle nut, FIG. 6 shows a longitudinal section through the gear wheel in FIG. 5, FIG. 7 shows a view of the gear wheel in FIG. 5 and FIG. 8 shows a view of a further ball screw according to the invention.

DETAILED DESCRIPTION OF THE DRAWING

The ball screw according to the invention depicted in FIGS. 1 and 2 has a recirculating ball screw 1, on which a spindle nut 2 is rotatably supported. On the inner circumference of the spindle nut 2, turns 3 of ball grooves 4, helically wound around the recirculating ball spindle 1, are provided, in which balls 5 can roll. The recirculating ball spindle 1 is likewise provided with a helically wound ball groove 6. The ball grooves 4 and 6 define a ball duct 7, in which the balls 5 circulate.

The spindle nut 2 is further provided with multiple return elements 8 distributed over the circumference. The return elements 8 are arranged on the outer circumference of the spindle nut 2. The ends of the return elements 8 connect a start of a turn 3 to an end of a turn 3, so that a continuous ball duct 7 is formed for recirculation of the balls 5. FIG. 2 shows that an end of the return element 8 engages in a bore 10 provided on the spindle nut 2, in order to join the return duct 9 to the ball groove 4, that is to the ball duct 7.

It can also be seen from FIG. 1 that an adapter 11 is arranged on the spindle nut. This adapter 11 is rotationally fixed to the spindle nut 2. This adapter 11 serves for the accommodation and fixing of a gear wheel (not shown here) for driving the spindle nut 2. One of the return elements 8 is arranged in each recess 12 of the adapter 11. The return element 8 bears on the circumferential surface of the spindle nut 2. The radially outer external contour of the return element 8 is of circular arc-shaped design. The recess 12 of the adapter 11 is defined radially outwards by a wall 13 likewise of circular arc-shaped design. A slight gap is formed between the return element 8 and the wall 13 of the adapter 11. Spring elements 14 integrally formed onto the return element 8 stand proud of the external contour of the return element 8 (FIG. 2) and are sprung against the wall 13 of the adapter 11. The adapter 11 here serves as support 15 for radially supporting the return element 8. It can be seen from FIG. 2 that a spring element 14 is provided at each of the two peripheral ends of the return element 8. In this symmetrical arrangement of the spring elements 14 a uniform radial support of the return element 8 on the support 15 is assured. The spring elements 14 are resilient spring points 14a of the return element 8.

FIGS. 3 and 4 show a half of the return element 8 and an enlarged detail in FIG. 4. FIG. 3 clearly shows the one half-length of the return duct 9 and the spring elements 14, which stand proud of the circular arc-shaped external contour of the return element 8. In FIG. 4 the slight gap s between the circular arc-shaped external contour of the return element 8 and the wall of the support 15, not depicted here, is identified by s. This gap s corresponds to a maximum spring travel by which the spring element 14 can be compressed. On reaching the maximum spring travel s, the circular arc-shaped contours of the return element 8 and the wall 13 touch one another, so that a further deflection of the return element 8 is excluded. The contours of the wall 13 and the return element 8 serve as stops for limiting the spring travel s. FIG. 4 clearly shows the design of the spring element 14 as a web 16. The web 16 is elastically deformable. The web 16 is radially defined by a recess 16a in the return element 8 and by the external contour of the return element 8. The recess 16a is arranged at an interval from the external contour.

In a further ball screw according to the invention the adapter is removed and is replaced by a gear wheel 17, which may be mounted directly onto the spindle nut 2. Since this exemplary embodiment according to FIGS. 5-7 is distinguished from that described above only by the gear wheel 17 provided here, the description of this exemplary embodiment will be confined solely to the design and function of the gear wheel 17. The gear wheel 17 is likewise arranged, rotationally fixed on the spindle nut 2. Chambers 19, each designed to accommodate one of the return elements 8, are formed between a toothed rim 18 of the gear wheel 17 and the spindle nut 2. As in the preceding exemplary embodiment, the chamber 19 is here defined by a circular arc-shaped wall 20 of the toothed rim 18. As in the exemplary embodiment described above, the return element 8 is supported by its spring elements 14 against the toothed rim 18. The design of the chamber 19 can clearly be seen from FIG. 6. FIG. 7 clearly shows the circular arc-shaped design of the wall 20. In this ball screw according to the invention also, the gear wheel 17 serves as support 21 for the return element 8.

The ball screw according to the invention depicted in FIG. 8 largely corresponds to the ball screw depicted in FIGS. 1 and 2. The recirculating ball screw has been omitted from the figure. In this figure an adapter 22 is provided for the rotationally fixed connection to the spindle nut 2. This adapter 22, like the adapter 11, has a chamber 23 to accommodate the return element 8. In this figure it is possible to discern the radial distance (=spring travel s) between the circular arc-shaped external contour of the return element 8 and the circular arc-shaped contour of the wall 24 of the adapter 22 defining the chamber 23. It can be seen that the spring elements 14 arranged at the peripheral ends of the return element 8 are supported on, that is to say sprung against the wall 24 of the adapter 22.

The return pieces depicted and described here are all made from injection moulded thermoplastic material. Other plastics may be used, depending on the application.

LIST OF REFERENCE NUMERALS

1 Recirculating ball screw
2 Spindle nut
3 Turn
4 Ball groove
5 Ball
6 Ball groove
7 Ball duct
8 Return element
9 Return duct
10 Bore
11 Adapter
12 Recess
13 Wall
14 Spring element
14a Spring point
15 Support
16 Web
16a Recess
17 Gear wheel
18 Toothed rim
19 Chamber
20 Wall
21 Support
22 Adapter
23 Chamber
24 Wall

The invention claimed is:

1. A ball screw, having a spindle nut provided on a recirculating ball screw and on an inner circumference of which turns of ball grooves, helically wound around an axis, are provided in which balls roll, at least one return element, arranged on an outer circumference of the spindle nut and provided with a return duct for the balls, at two ends of said return element connecting a start of a turn to an end of a turn to permit a continuous recirculation of the balls, wherein the ends of the return duct engage in bores provided on the spindle nut, to join the return duet to the ball groove, and wherein the return element between two ends being supported on a support, wherein the return element is resiliently supported in radial direction by means of at least one spring element on the support, wherein a spring travel (s) of the spring for movements between the support and the return element, is limited by stops provided on the return element and on the support wherein the return element is resiliently formed on at least one spring point facing the support and this spring point is sprung against the support and wherein the return element has an external contour matched to an internal contour of the support, the return element being provided at a distance from the external contour with at least one recess, in such a way that the recess and the external contour define a resilient web forming the spring element.

2. A ball screw of claim 1, wherein multiple said spring elements are arranged, symmetrically distributed, between the ends of the return element.

3. A ball screw of claim 1, wherein the return element is itself resilient and is resiliently supported on the support.

4. A ball screw of claim 1, wherein said spring element is a spring arranged between the return element and the support.

5. A ball screw of claim 1, wherein multiple said spring points are arranged, symmetrically distributed, between the ends of the return element.

6. A ball screw of claim 1, wherein the web stands separate from the external contour of the return element.

7. A ball screw of claim 1, wherein a gear wheel is arranged rotationally fixed on the spindle nut, a chamber to accommodate the return element being provided between a toothed rim of the gear wheel and the spindle nut.

8. A ball screw of claim 7, wherein an internal contour of the toothed rim and the external contour of the return element are matched to one another, the spring element being supported on the internal contour of the toothed rim.

9. A ball screw of claim 1, wherein the return element and the spring element, integrally formed onto the return element, are made from plastic material.

10. A ball screw of claim 1, wherein, the spring element standing proud of the external contour of the return element and being resiliently supported on the support, a spring travel (s) of the spring element being defined by the distance between the internal contour of the support and the external contour of the return element.

* * * * *